United States Patent
Ramakrishnan

(10) Patent No.: US 10,338,718 B2
(45) Date of Patent: Jul. 2, 2019

(54) LIKELIHOOD DETECTION OF PRESSING FINGER IN TWO-FINGER TOUCH

(71) Applicant: Synaptics Incorporated, San Jose, CA (US)

(72) Inventor: Shubha Ramakrishnan, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 526 days.

(21) Appl. No.: 15/087,997

(22) Filed: Mar. 31, 2016

(65) Prior Publication Data
US 2017/0285796 A1 Oct. 5, 2017

(51) Int. Cl.
*G06F 3/044* (2006.01)
*G06F 3/041* (2006.01)

(52) U.S. Cl.
CPC .......... *G06F 3/0414* (2013.01); *G06F 3/0416* (2013.01); *G06F 2203/04104* (2013.01)

(58) Field of Classification Search
CPC ......... G06F 2203/04104; G06F 3/0414; G06F 3/0416
See application file for complete search history.

(56) References Cited

U.S. PATENT DOCUMENTS

2017/0038905 A1* 2/2017 Bijamov .............. G06F 3/0414
2017/0192582 A1* 7/2017 Pan ....................... G06F 3/0416

* cited by examiner

*Primary Examiner* — Jennifer Mehmood
*Assistant Examiner* — Deeprose Subedi
(74) *Attorney, Agent, or Firm* — Ferguson Braswell Fraser Kubasta PC

(57) ABSTRACT

A processing system for a force sensing device, including: sensor circuitry that receives resulting signals from force sensors; and processing circuitry that: determines a first location of a first input object and a second location of a second input object on a surface; determines force values for the force sensors based on the resulting signals; obtains a first plurality of expected force values for the force sensors based on the first location and a second plurality of expected force values for the force sensors based on the second location; executes a first comparison of the first plurality of expected force values to the force values; executes a second comparison of the second plurality of expected force values to the force values; and determines, based on the first comparison and the second comparison, that the first input object is applying an input force to the surface.

19 Claims, 8 Drawing Sheets

LIKELIHOOD DETECTION OF PRESSING FINGER IN TWO-FINGER TOUCH

FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebooks or desktop computers). Proximity sensor devices are also often used in smaller computing systems (such as touch screens integrated in cellular phones).

SUMMARY

In general, in one aspect, embodiments relate to a processing system for a force sensing device. The processing system comprises: sensor circuitry configured to receive resulting signals from a plurality of force sensors; and processing circuitry configured to: determine a first location of a first input object and a second location of a second input object on a surface of the force sensing device; determine a plurality of force values for the plurality of force sensors based on the resulting signals; obtain a first plurality of expected force values for the plurality of force sensors based on the first location and a second plurality of expected force values for the plurality of force sensors based on the second location; execute a first comparison of the first plurality of expected force values to the plurality of force values; execute a second comparison of the second plurality of expected force values to the plurality of force values; and determine, based on the first comparison and the second comparison, that the first input object is applying an input force to the surface.

In general, in one aspect, embodiments relate to a method for operating a force sensor device comprising a surface. The method comprises: receiving resulting signals from a plurality of force sensors; determining a first location of a first input object and a second location of a second input object on the surface; determining a plurality of force values for the plurality force sensors based on the resulting signals; obtaining a first plurality of expected force values for the plurality of force sensors based on the first location and a second plurality of expected force values for the plurality of force sensors based on the second location; executing a first comparison of the first plurality of expected force values to the plurality of force values; executing a second comparison of the second plurality of expected force values to the plurality of force values; and determining, based on the first comparison and the second comparison, that the first input object is applying an input force to the surface.

In general, in one aspect, embodiments relate to an input device. The input device comprises: a surface; a plurality of force sensors; and a processing system that: receives resulting signals from a plurality of force sensors; determines a first location of a first input object and a second location of a second input object on the surface; determines a plurality of force values for the plurality force sensors based on the resulting signals; obtains a first plurality of expected force values for the plurality of force sensors based on the first location and a second plurality of expected force values for the plurality of force sensors based on the second location; executes a first comparison of the first plurality of expected force values to the plurality of force values; executes a second comparison of the second plurality of expected force values to the plurality of force values; and determines, based on the first comparison and the second comparison, that the first input object is applying an input force to the surface.

Other aspects of the invention will be apparent from the following description and the appended claims.

DETAILED DESCRIPTION

Figure 1:
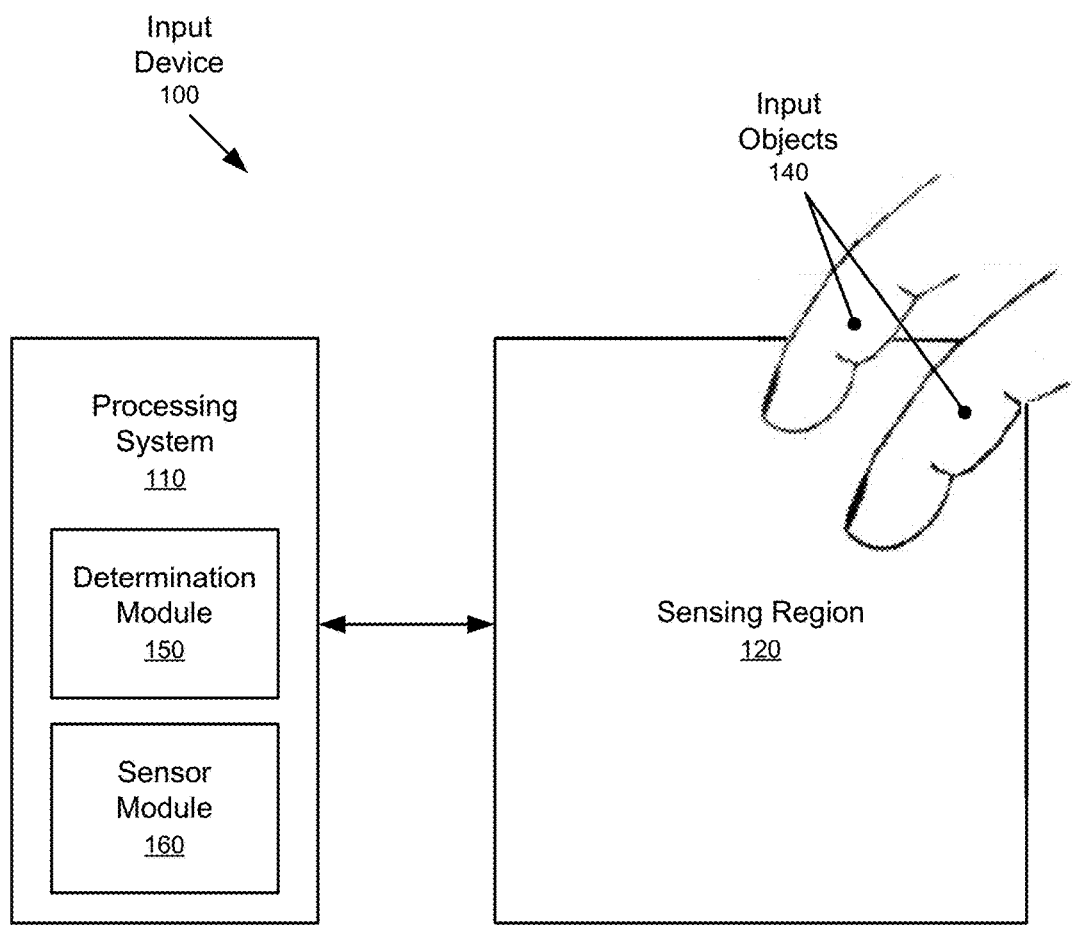
FIG. 1 shows a schematic diagram of an input device in accordance with one or more embodiments of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is used to distinguish between the elements. By way of an example, a first element is distinct from a second element, and the first element may encompass more than one element and succeed the second element in an ordering of elements.

One or more embodiments of the invention are directed towards determining, when multiple input objects are present, which input object is applying the largest input force to a surface of an input device. Each of the remaining one or more input objects are deemed to be applying less input force to the surface or just touching the surface. Dependent on the specific implementation of the input device, it may be difficult for the typical input device to distinguish between the input object applying the largest input force and the remaining input object(s). That is, when a spacing between force sensors is wide and/or the surface deforms globally across the cover rather than only locally where the input object applies the force, it may be difficult to determine which one of the input objects is applying the largest input force. Accordingly, in these input devices, there is a need to accurately determine which input object of a plurality of input objects is applying the largest force. Some embodiments of the claimed invention include measuring deflections at existing force sensor locations, calculating expected deflections for the plurality of input objects in conjunction with a model, comparing the measured deflections with the expected deflections, and determining that the input object applying the force is the input object with the smallest deviation between the measured deflection and the expected deflection.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular/mobile phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module (150) may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a force enabled touchpad system (also often referred to as a "touchpad" or a "touch sensor device") configured to sense input provided by one or more input objects (140) in a sensing region (120). Example input objects include fingers as shown in FIG. 1, thumb, palm, styli, and combinations thereof. However, embodiments of the invention are not limited to these input objects. Further, the sensing region (120) is illustrated schematically as a rectangle in FIG. 1. However, it should be understood that the sensing region may be of any convenient form and in any desired arrangement on the surface of and/or otherwise integrated with the touchpad.

Sensing region (120) includes sensors for detecting force and touch, as described in greater detail below in conjunction with FIG. 2. Some embodiments of the invention sense input by contact with an input surface (e.g., a touch surface) of the input device (100) or contact with an input surface of the input device (100) coupled with some amount of applied force or pressure. In various embodiments, input surfaces may be provided by surfaces of casings within which sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a trans capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Regardless of whether mutual capacitance or absolute capacitance sensing methods are used, modulating the sensor electrodes may be referred to as driving the sensor electrode with varying voltage signal or exciting a sensor electrode. Conversely, sensor electrodes may be connected to a ground (e.g., system ground or any other ground). Connecting the sensor electrodes to a ground or holding electrodes substantially constant may be referred to a connecting the sensor electrodes to a constant voltage signal. In other words, a constant voltage signal includes a substantially constant voltage signal without departing from the scope of the invention. Further, the sensor electrodes may be of varying shapes and/or sizes. The same shapes and/or sizes of sensor electrodes may or may not be in the same groups. For example, in some embodiments, receiver electrodes may be of the same shapes and/or sizes while in other embodiments receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like.

In some embodiments, components composing the processing system (110) are located together, such as near sensing element(s) of the input device (100). In other embodiments, components of processing system (110) are physically separate with one or more components close to sensing element(s) of input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a smart phone, and the processing system (110) may include circuits and firmware that are part of a main processor of the smart phone. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when an input object is in a sensing region, determine positional information of an input object, determine force information for an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes (e.g., powering on a screen or touchscreen), as well as graphical user interface (GUI) actions such as cursor movement, rearrangement of icons, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. Specifically, the processing system is configured to determine positional information for objects sensed by a sensor in the sensing region. This positional information can then be used by the system to provide a wide range of user interface functionality. Furthermore, the processing system (110) is configured to determine force information for objects from measures of force determined by the sensor in the sensing region. This force information can then also be used by the system to provide a wide range of user interface functionality.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. Further, positional information and force information from the processing systems may be used to facilitate a full range of interface inputs, including use of the touch-enabled proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. These additional input components may include mechanical buttons, sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system (110). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2A:
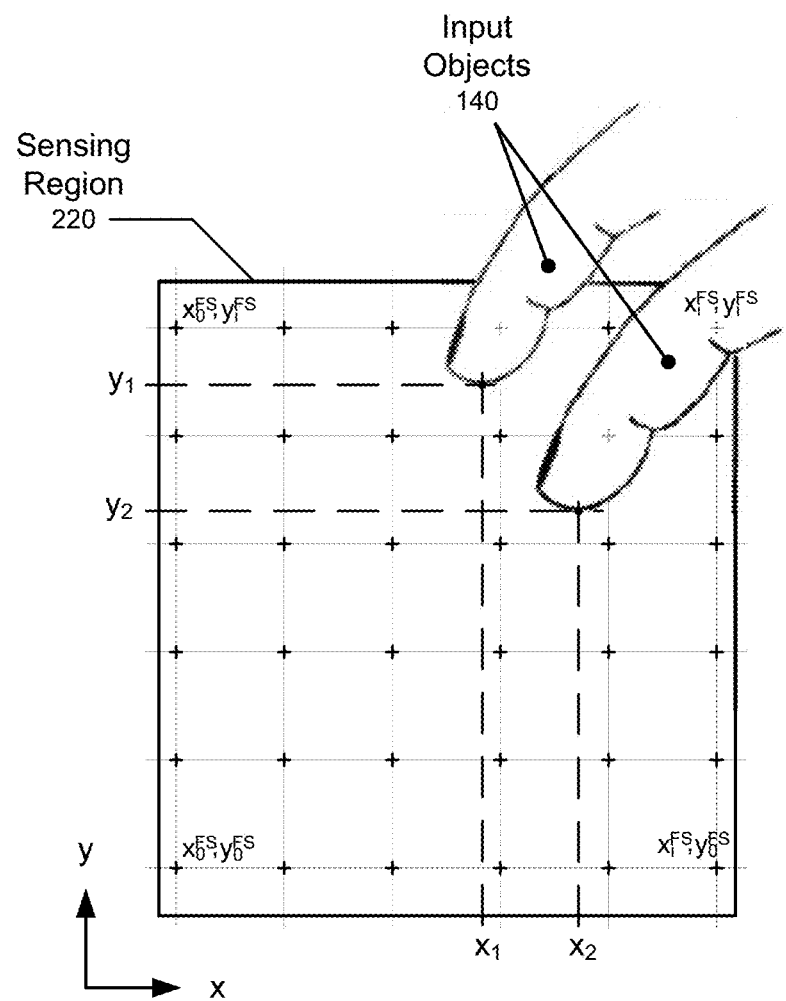
FIG. 2A shows a schematic diagram of a sensing region in accordance with one or more embodiments of the invention.

FIG. 2A depicts a sensing region (220) of an input surface of an input device in accordance with one or more embodiments of the invention. The input device may correspond to input device (100) and the sensing region (220) may correspond to sensing region (120), discussed above in reference to FIG. 1. Further, as described in reference to FIG. 1, the processing system (110) is configured to detect input in the sensing region (120) in FIG. 1. In some embodiments, the sensing region (220) may be located on a side of a mobile device. However, embodiments of the invention are not limited to this location and the sensing region (220) may be located in a multitude of other locations without departing from the scope of the invention.

In one or more embodiments depicted in FIG. 2A, an exemplary coordinate system indicating "x" and "y" axes is shown. Embodiments may use another coordinate system or a different orientation of the coordinate system. Further, FIG. 2A depicts the locations of force sensors (FS) within a force sensor array of the sensing region (220). Specifically, the force sensors of the force sensor array are shown located at the intersections of the horizontal and vertical lines and are indicated by a "+". The force sensor label "$x_0^{FS}$, $y_0^{FS}$" refers to the location of a force sensor (FS) at the location x=0 and y=0 within the force sensor array. In addition, the force sensor label "$x_i^{FS}$, $y_0^{FS}$" refers to the location of another force sensor (FS) at the location x=i and y=0, where "i" is an integer. Analogously, the force sensor label "$x_0^{FS}$, $y_i^{FS}$" refers to the location of another force sensor (FS) at the location x=0 and y=i, where "i" is the integer. Also, the force sensor label "$x_i^{FS}$, $y_i^{FS}$" refers to the location of a further force sensor (FS) at the location x=i and y=0, where "i" is an integer.

In one or more embodiments, the integer "i" of force sensors in the x-direction is the same integer "i" of the force sensors in the y-direction. In other words, referring to the embodiment depicted in FIG. 2A, the number of force sensors in the force sensor array in the x-direction and the y-direction are equal. However, other embodiments of the claimed invention may include a different number of force sensors in the x-direction and the y-direction, which may be denoted with integers "i" and "j", respectively. In yet other embodiments, the number of force sensors in the force sensor array in the x-direction and the y-direction are equal, but the spacing, i.e., the pitch, between the force sensors in the x-direction and the y-direction may be different. In addition, while the embodiment described in reference to FIG. 2A includes a Cartesian coordinate system, other embodiments may use force sensor locations in accordance with a polar coordinate system.

In one or more embodiments of the invention, each force sensor includes two electrodes separated by a spacing or gap. The spacing may include air. Alternatively, the spacing may be filled with other dielectrics. One electrode is driven as a transmitter ("transmitter electrode") and the other electrode is driven as a receiver ("receiver electrode"). When an input object (e.g., finger) applies a force to the surface, either the transmitter electrode or the receiver electrode deflects toward the other electrode, effectively reducing the spacing between the transmitter electrode and the receiver electrode. This reduction in the spacing is reflected in the resulting signal received by the sensor module (160). Additional processing may be performed on the resulting signal to determine the deflection of the surface at or near the force sensor.

In one or more embodiments of the invention, each force sensor includes two electrodes separated by a spacing or gap. The spacing may include air. Alternatively, the spacing may be filled with other dielectrics. One electrode is operated as an absolute capacitance sensor, while the other electrode is driven with a constant reference voltage. When an input object (e.g., finger) applies a force to the surface, one electrode deflects towards the other, effectively reducing the spacing between the electrodes. This reduction in the spacing is reflected in the resulting signal received by the sensor module (160). Additional processing may be performed on the resulting signal to determine the deflection of the surface at or near the force sensor.

Still referring to FIG. 2A, the sensing region (220) might include a touch sensor array which is not shown for the sake of clarity. In the embodiment described in reference to FIG. 2A, the spacing, i.e., the pitch, between the touch sensors in the x-direction and the y-direction is smaller than the pitch of the force sensor array. In other words, in the embodiment depicted in FIG. 2A, the density of touch sensors within the sensing region (220) is greater than the density of force sensors within the sensing region (220). However, embodiments of the invention are not limited to the density of touch sensors being greater than the density of force sensors within the sensing region (220) and other embodiments may include other densities of sensors without departing from the scope of the invention.

In one or more embodiments, at least one of the force sensors also operates as a position sensor. For example, the sensor may utilize the same transmitter electrode(s) for both force and position sensing, but have one set of receiver electrodes for force sensing and a different set of receiver electrodes for position sensing. Additionally or alternatively, the transmitter electrodes that are used to detect position may be operated in absolute capacitance sensing mode to detect deflection, resulting from an applied force, towards another electrode. Additionally or alternatively, the transmitter electrodes may be operated as receiver electrodes to receive signals from other transmitters.

Two input objects (140) are shown within the sensing region (220) in FIG. 2A. In the embodiment described in reference to FIG. 2, the two input objects (140) are fingers. However, as described above, other embodiments may include other input objects, e.g., thumb, palm, and styli, and combinations thereof. One of the input objects (140) is making contact with the surface at location $x_1$, $y_1$. The other of the input objects (140) is making contact with the surface at location $x_2$, $y_2$. Even though both input objects (140) may be applying input forces to the surface, one input object is applying the largest input force. In one or more embodiments, one input object is only touching (i.e., applying little to no input force), while the other input object is applying the input force.

Further, as a result of the applied force by one of the input objects (140) on the input surface within the sensing region (220), a front surface of the touchscreen (e.g., a cover) is physically deflected globally rather than only locally where the other of the input objects (140) applies the force to the touchscreen. Specifically, the front surface of the touchscreen generally deflects more in a center of the surface when compared to a perimeter of the surface. This is, because at least a portion of the perimeter of the front surface of the touchscreen is rigidly supported, e.g., bonded to a support. Accordingly, one or more embodiments of the invention may include a pitch of the force sensor array which is non-linear across the force sensor array and the pitch of the force sensor array may decrease from the center toward the perimeter of the touch sensor array. However, embodiments of the invention are not limited to this particular non-linear force sensor array pitch. Other embodiments may include non-linear force sensor array arrangements without departing from the scope of the invention.

In addition, embodiments of the invention are not limited to two input objects making contact with the input surface within the sensing region (220). Some embodiments may include more than two input objects. The input objects may be of the same or different types.

As described earlier, some embodiments of the claimed invention advantageously relate to measuring deflections at existing force sensor locations, calculating expected deflections for the plurality of input objects in conjunction with a model, comparing the measured deflections with the expected deflections, and determining that the input object applying the force is the input object with the smallest deviation between the measured deflection and the expected deflection. For example, the processing system (110) depicted in FIG. 1 may be configured to calculate an expected deflection of the input surface (a first expected deflection) for a first input object and a second expected deflection of the input surface (a second expected deflection) for a second input object at each force sensor location of the force sensor array within the sensing region (220) in FIG. 2A, based on a bending model. The bending model may be an empirical bending model and constants of the empirical bending model may be acquired during a calibration of the input surface. These advantageous features of the invention are explained in detail in reference to method (300) described below.

Figure 2B:
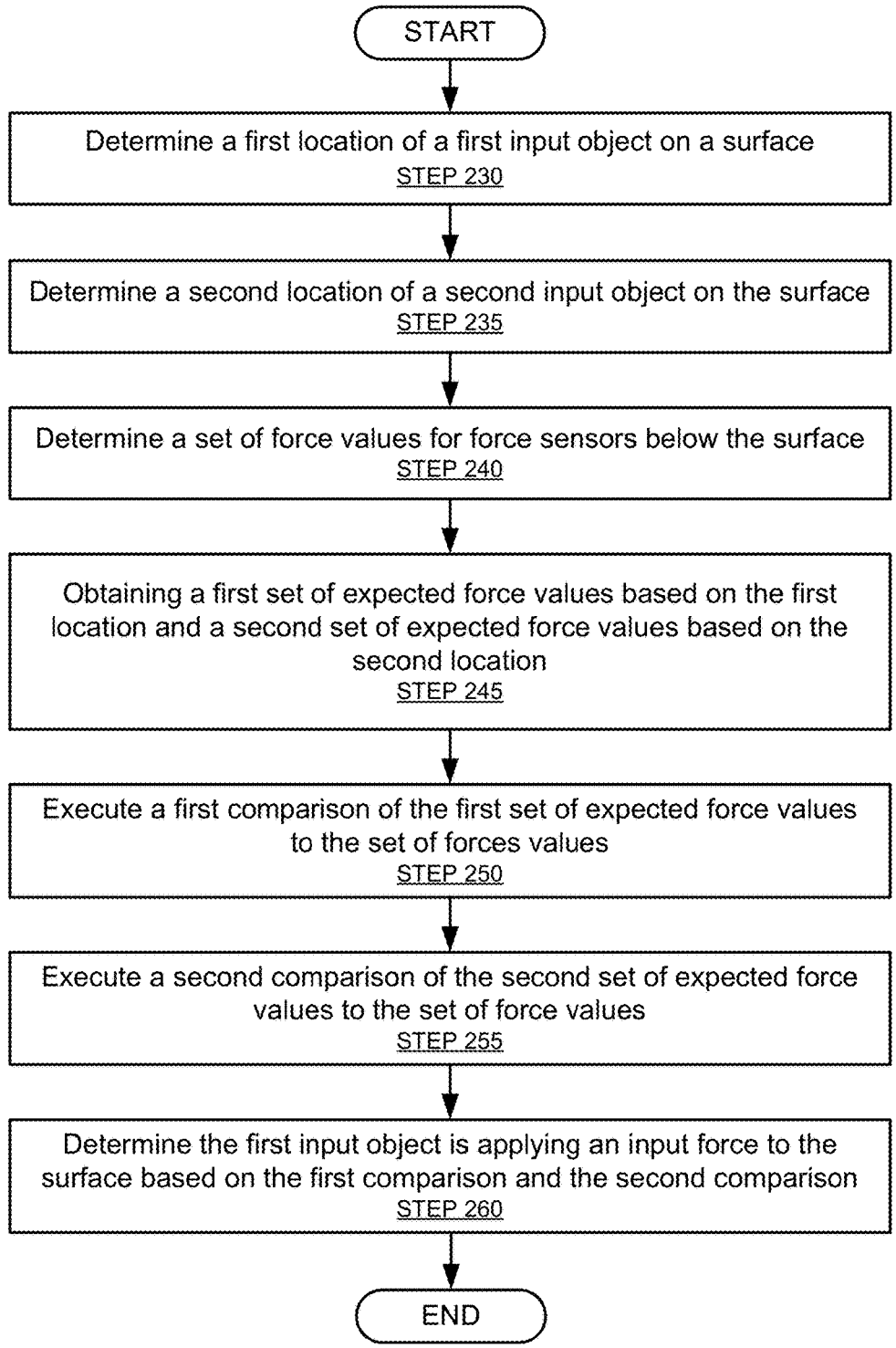
FIGS. 2B, 3A, 3B, and 3C show flowcharts in accordance with one or more embodiments of the invention.

FIG. 2B shows a flowchart in accordance with one or more embodiments. The flowchart depicts a process for operating an input device having a surface. One or more of the steps in FIG. 2B may be performed by the components and variations of the input device (100), discussed above in reference to FIGS. 1 and 2. In addition, the steps in FIG. 2B may be partially performed by a processing system and partially performed by a host device communicatively coupled to the processing system. In one or more embodiments of the invention, one or more of the steps shown in FIG. 2B may be omitted, repeated, and/or performed in a different order than the order shown in FIG. 2B. Accordingly, the scope of the invention should not be considered limited to the specific arrangement of the steps shown in FIG. 2B.

In STEP 230 and STEP 235, the location of each input object (e.g., finger) on the surface of the input device is determined. The surface may be part of a touchscreen or touchpad. The location may be determined using touch sensors (i.e., position sensors) located below the surface. One of the input objects is applying the largest input force to the surface. The one or more remaining input objects are applying smaller input forces to the surface or just touching the surface. However, it is unknown at this point in the process which input object is applying the largest input force and which input object(s) is applying the smaller input force or just touching the surface.

In STEP 240, a set of force values for the force sensors below the surface is determined. One or more of the force sensors may correspond to a position sensor in STEP 230 or STEP 235. In other words, a force sensor may be used to detect force in some instances and the locations of input objects in other instances. As discussed above, applying force to the surface causes the surface, and thus the force sensors below the surface, to deflect. This deflection changes the resulting signals sent by the force sensors. The force values may be determined by processing the resulting signals (e.g., integrating the resulting signals and converting the resulting signals to digital values). The measured deflection is one example of a force value.

In STEP 245, two sets of expected force values are obtained. One set of expected force values is based on an input force being applied at the first location. The other set of expected force values is based on an input force being applied at the second location. The size of the first set of expected values equals the size of the second set of expected values, which also equals the size of the set of determined force values in STEP 240. Moreover, each element in each expected set of force values corresponds to one of the force sensors. An expected deflection is one example of an expected force value.

In STEP 250 and STEP 255, the force values of STEP 240 are compared against the first set of expected force values and the second set of expected force values. Each comparison may require calculating a deviation (e.g., a Euclidean distance) between the force values and the expected force values. Accordingly, at least two deviations may be calculated (i.e., one for each comparison).

In STEP 260, it is determined that the first input object at the first location is applying the largest input force to the surface. The remaining input object is deemed to be applying a smaller input force or just touching the surface. This determination is based on which calculated deviation is smaller. Specifically, the deviation between the force values and the first set of expected force values was deemed to be smaller than the deviation between the force values and the second set of expected values.

Figure 3A:
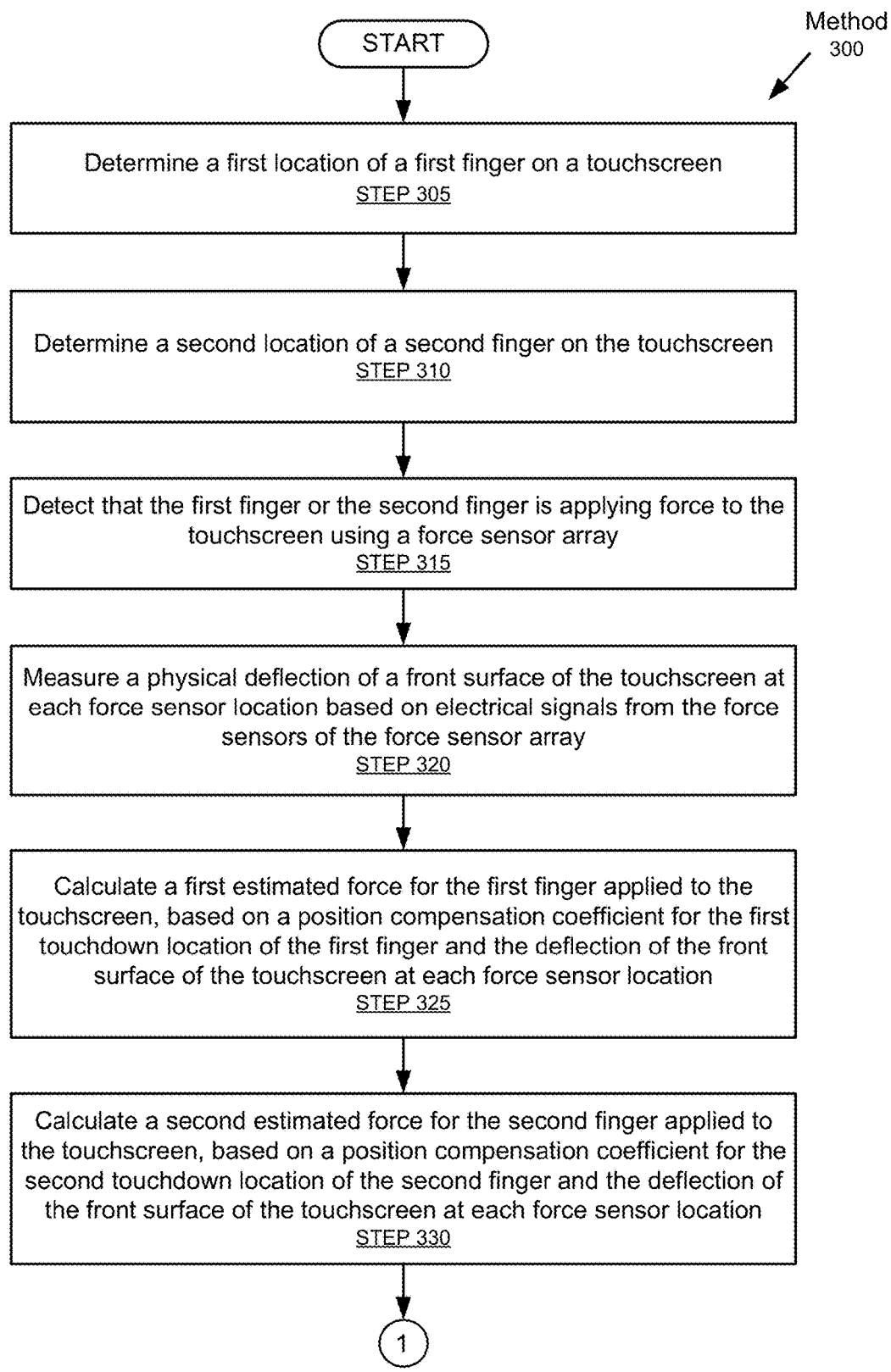
Figure 3B:
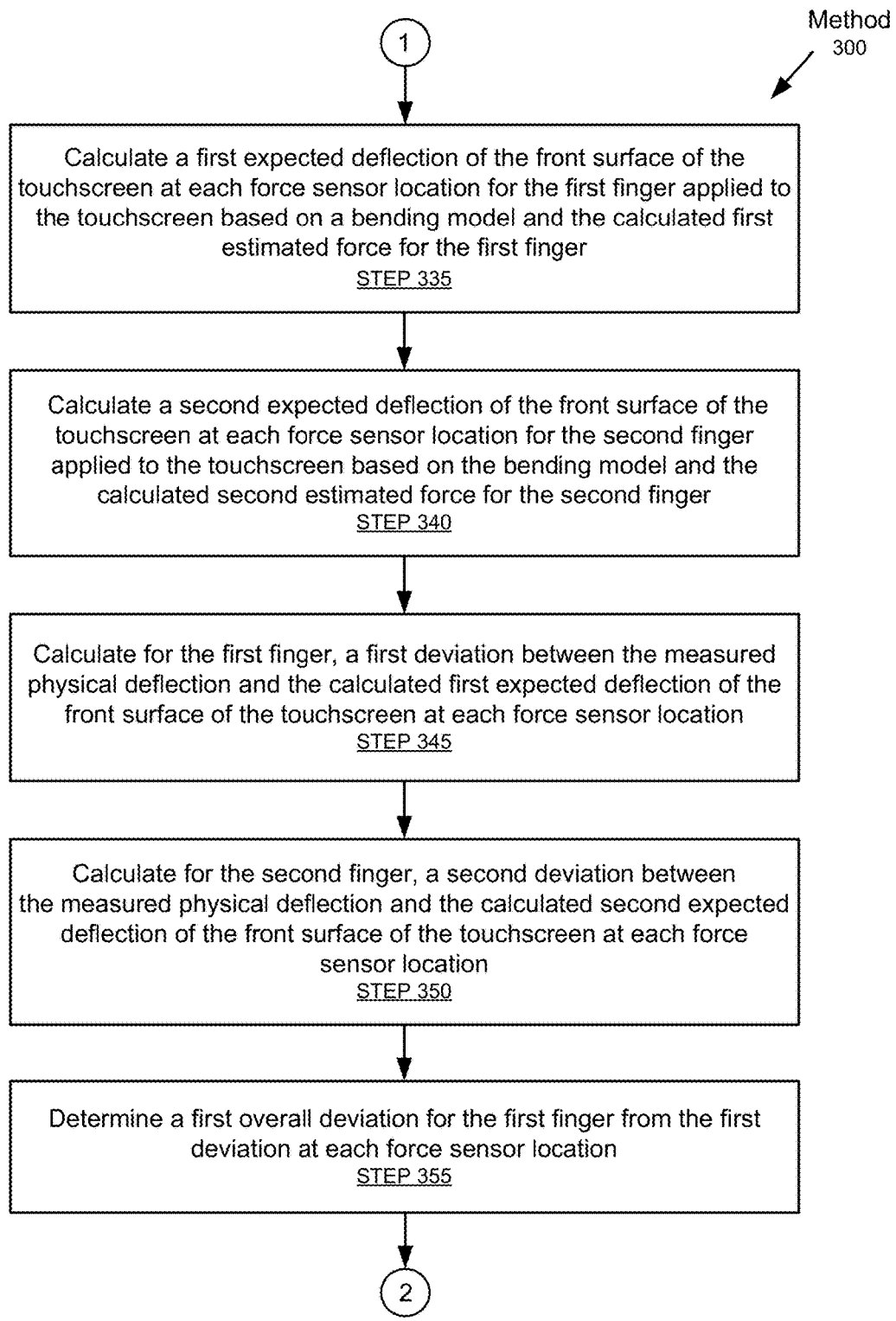
Figure 3C:
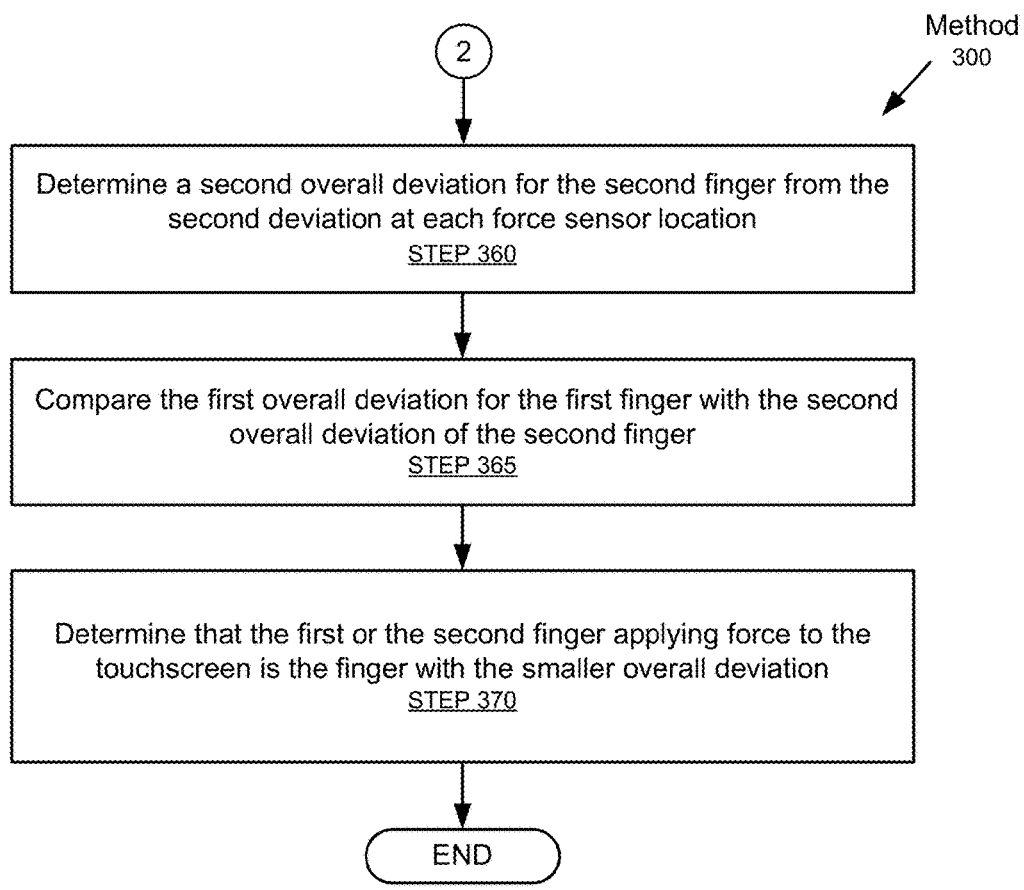

FIGS. 3A-3C show a flowchart for determining an input object of a plurality of input objects imparting a force onto an input surface in accordance with one or more embodiments of the invention. One or more of the steps in FIGS. 3A-3C may be performed by the components and variations of the input device (100), discussed above in reference to FIGS. 1 and 2. In addition, the steps in FIGS. 3A-3C may be partially performed by a processing system and partially performed by a host device communicatively coupled to the processing system. In one or more embodiments of the invention, one or more of the steps shown in FIGS. 3A-3C may be omitted, repeated, and/or performed in a different order than the order shown in FIGS. 3A-3C. Accordingly, the scope of the invention should not be considered limited to the specific arrangement of the steps shown in FIGS. 3A-3C.

Referring to FIG. 3A, a first location of a first input object (e.g., a first finger) on an surface (e.g., a touchscreen) within the sensing region is initially determined using a touch sensor array (STEP 305). The sensing region may be the sensing region (220) in FIG. 2A. As described in reference to FIG. 2A, the determination that the first finger is applying a touch to the input surface within the sensing region (220) may be based on electrical signals from the touch sensor array. The determined location of the first finger on the touchscreen is at $x_1$, $y_1$. In addition, a second touchdown location of a second input object (e.g., a second finger) on the touchscreen within the sensing region is determined using the touch sensor array (STEP 310). The determined location of the first finger on the touchscreen is at $x_2$, $y_2$.

Still referring to FIG. 3A, using a force sensor array, it is detected that one of the two fingers, the first or the second finger, is applying force to the touchscreen (STEP 315). The force sensor array may be the force sensor array described in reference to FIG. 2A. Further, as described in reference to FIG. 2A, the determination that one of the first or the second finger, is applying a force to the touchscreen within the sensing region (220) may be based on electrical signals from the force sensor array. Specifically, as described in reference to FIG. 2A, the determination that one of the first or the second finger, is applying a force to the touchscreen within the sensing region (220) may be responsive to that the applied force on the touchscreen exceeds a predetermined force threshold.

As a result of the applied force on the touchscreen, a front surface of the touchscreen (e.g., a cover) is physically deflected globally rather than only locally where one of the first or the second finger applies the force to the touchscreen.

The physical deflection of the front surface of the touchscreen is measured at each force sensor location within the force sensor array based on electrical signals from the force sensors of the force sensor array (STEP 320). Physical deflection is one example of a force value. Specifically, if the M force sensor locations are $x_i^{FS}$, $y_i^{FS}$ as indicated in FIG. 2A, then the deflection of the front surface of the touchscreen at each force sensor location due to an unknown force F' is measured according to Equation 1 (Eq. 1). Specifically, m refers to an individual deflection at each force sensor location within the deflection matrix m.

$$\vec{m}=[m(x_1^{FS},y_1^{FS},F')\ldots m(x_M^{FS},y_M^{FS},F')] \qquad (\text{Eq. 1})$$

Referring to FIG. 3A and assuming that the first finger at the touchdown location $x_1$, $y_1$ is the finger which applies the force to the touchscreen, a first estimated force is calculated for the first finger applied to the touchscreen (STEP 325). The first estimated force $\widetilde{F}_1$ is calculated according to Equation 2 (Eq. 2) and is based on a position compensation coefficient p for the first touchdown location $x_1$, $y_1$ for the first finger and the deflection m of the front surface of the touchscreen at each force sensor location $x_i^{FS}, y_i^{FS}$.

$$\widetilde{F}_1 = p(x_1,y_1)*\Sigma_i m(x_i^{FS},y_i^{FS},F') \qquad (\text{Eq. 2})$$

In Eq. 2, the position compensation coefficient $p(x_1,y_1)$ arises from the fact that the front surface of the touchscreen generally deflects more in the center of the touchscreen when compared to the circumference of the touchscreen. This is, because at least a portion of the circumference of the front surface of the touchscreen is rigidly supported.

Analogously, assuming that the second finger at the touchdown location $x_2$, $y_2$ is the finger which applies the force to the touchscreen, a second estimated force is calculated for the second finger applied to the touchscreen (STEP 330). The second estimated force $\widetilde{F}_2$ is calculated according to Equation 3 (Eq. 3) and is analogously based on a position compensation coefficient p for the second touchdown location $x_2$, $y_2$ for the second finger and the deflection m of the front surface of the touchscreen at each force sensor location $x_i^{FS}, y_i^{FS}$.

$$\widetilde{F}_2 = p(x_2,y_2)*\Sigma_i m(x_i^{FS},y_i^{FS},F') \qquad (\text{Eq. 3})$$

In Eq. 3, the position compensation coefficient $p(x_2,y_2)$ is based on a similar rationale as the position compensation coefficient $p(x_1,y_1)$ described in reference to Eq. 2.

Now referring to FIG. 3b, a first expected deflection $\vec{d}_1$ of the front surface of the touchscreen at each force sensor location is calculated for the first finger applied to the touchscreen (STEP 335). Expected deflection is one example of an expected force value. Specifically, the calculation of the first expected deflection $\vec{d}_1$ is based on a bending model and the calculated first estimated force $\widetilde{F}_1$ for the first finger according to Equation 4 (Eq. 4).

$$\vec{d}_1=[d_1(x_1^{FS},y_1^{FS},\widetilde{F}_1)\ldots d_1(x_M^{FS},y_M^{FS},\widetilde{F}_1)] \qquad (\text{Eq. 4})$$

In Eq. 4, $d_1$ refers to an individual expected deflection at each force sensor location within the expected deflection matrix $\vec{d}_1$. Further, $x_1^{FS}, y_1^{FS}$ through $x_M^{FS}, y_M^{FS}$ refer to the individual force sensor locations within the force sensor array of M force sensors.

Analogously to Eq. 4, Equation 5 (Eq. 5) describes a calculation of a second expected deflection $\vec{d}_2$ of the front surface of the touchscreen at each force sensor location for the second finger applied to the touchscreen (STEP 340). Expected deflection is one example of an expected force value. Specifically, the calculation of the second expected deflection $\vec{d}_2$ is also based on the bending model and the calculated second estimated force $\widetilde{F}_2$ for the second finger.

$$\vec{d}_2=[d_2(x_1^{FS},y_1^{FS},\widetilde{F}_2)\ldots d_2(x_M^{FS},y_M^{FS},\widetilde{F}_2)] \qquad (\text{Eq. 5})$$

In Eq. 5, $d_2$ refers to an individual expected deflection at each force sensor location within the expected deflection matrix $\vec{d}_2$. Further, $x_1^{FS}, y_1^{FS}$ through $x_M^{FS}, y_M^{FS}$ refer to the individual force sensor locations within the force sensor array of M force sensors.

With respect to Eq. 4 and Eq. 5, the bending model may be based, for example, on a Euler-Bernoulli bending model, a thin-plate bending model, or a three-dimensional finite elements model. However, embodiments of the claimed invention are not limited to these particular models. Some embodiments may include an empirical bending model for which the constants of the empirical bending model are acquired during a calibration of the touchscreen. The acquired constants may be stored in a look-up table in one or more embodiments of the invention. Other embodiments may include alternate models or simulation techniques, i.e., splines or regression functions, for calculating the expected deflection of the front surface of the touchscreen.

Subsequently, a first deviation is calculated for the first finger between the measured physical deflection m and the calculated first expected deflection $d_1$ of the front surface of the touchscreen at each force sensor location (STEP 345). In one or more embodiments of the invention, the first deviation may be calculated as a difference between the calculated first expected deflection $d_1$ and the measured physical deflection m of the front surface of the touchscreen at each force sensor location.

Analogously, a second deviation is calculated for the second finger between the measured physical deflection m and the calculated second expected deflection $d_2$ of the front surface of the touchscreen at each force sensor location (STEP 350). In one or more embodiments of the invention, the second deviation may be calculated as a difference between the calculated second expected deflection $d_2$ and the measured physical deflection m of the front surface of the touchscreen at each force sensor location.

Next, a first overall deviation for the first finger is determined (STEP 355) from the first deviation at each force sensor location according to Equation 6 (Eq. 6).

$$\|\vec{d}_i-\vec{m}\|_2 \qquad (\text{Eq. 6})$$

In Eq. 6, $\vec{d}_i-\vec{m}$ refers to the calculation of the first deviation for the first finger and the calculation of the second deviation for the second finger at each force sensor location, as described in reference to STEPS 345 and 350. Specifically, in Eq. 6, i=1 applies for the first finger and i=2 applies for the second finger. In addition, Eq. 6 computes the Euclidean norm of $\vec{d}_1-\vec{m}$ which is the square root of the sum of the first deviation squares.

Analogously, a second overall deviation for the second finger is also determined (STEP 360) from the second deviation at each force sensor location according to Eq. 6. Further, Eq. 6 computes the Euclidean norm of $\vec{d}_2-\vec{m}$, which is the square root of the sum of the second deviation squares.

However, embodiments of the invention are not limited to using Eq. 6 to calculate the first and second deviations and the first and second overall deviations. Other embodiments may include alternate equations, which quantify the respective deviations between measured and expected deflections of the front surface of the touchscreen.

In STEP 365, the calculated overall deviation for the first finger is compared with the calculated overall deviation for the second finger. Subsequently, a determination is made whether the first or the second finger, which is applying force to the touchscreen, is the finger with the smaller calculated overall deviation (STEP 370).

In an alternate embodiment, instead of calculating estimated forces according to Eq. 2 and Eq. 3, all deflections in of the front surface of the touchscreen, i.e., the first and second measured deflections and the first and second expected deflections are normalized by the force sensor location with the largest deflection.

For example, the normalized measured deflection of the front surface of the touchscreen at each force sensor location is described by Equation 7 (Eq. 7).

$$\vec{m_0} = \frac{[m(x_1^{FS}, y_1^{FS}, F') \ldots m(x_M^{FS}, y_M^{FS}, F')]}{\max_i m(x_i^{FS}, y_i^{FS}, F')} \quad \text{(Eq. 7)}$$

For a nominal force $F_0$, the expected deflection of the front surface of the touchscreen for the first finger at each force sensor location is calculated according to Equation 8 (Eq. 8). Specifically, the calculation of the first expected deflection $\vec{d_1}$ is based on a bending model.

$$\vec{d_1} = [d_1(x_1^{FS}, y_1^{FS}, F_0) \ldots d_1(x_M^{FS}, y_M^{FS}, F_0)] \quad \text{(Eq. 8)}$$

Analogously, for a nominal force $F_0$, the expected deflection of the front surface of the touchscreen for the second finger at each force sensor location is calculated according to Equation 9 (Eq. 9). Specifically, the calculation of the second expected deflection $\vec{d_2}$ is also based on the bending model.

$$\vec{d_2} = [d_2(x_1^{FS}, y_1^{FS}, F_0) \ldots d_2(x_M^{FS}, y_M^{FS}, F_0)] \quad \text{(Eq. 9)}$$

With respect to Eq. 8 and Eq. 9, the bending model may be based, for example, on a Euler-Bernoulli bending model, a thin-plate bending model, or a three-dimensional finite elements model. However, embodiments of the claimed invention are not limited to these particular models. Some embodiments may include an empirical bending model for which the constants of the empirical bending model are acquired during a calibration of the touchscreen. The acquired constants may be stored in a look-up table in one or more embodiments of the invention. Other embodiments may include alternate models or simulation techniques, i.e., splines or regression functions, for calculating the expected deflection of the front surface of the touchscreen.

The normalized expected deflection $\vec{d_{1,0}}$ for the first finger at each force sensor location is then calculated by dividing the expected deflection $\vec{d_1}$ for the first finger at each force sensor location by the maximum expected deflection $\max_i d_1(x_i^{FS}, y_i^{FS}, F_0)$ for the first finger according to Equation 10 (Eq. 10).

$$\vec{d_{1,0}} = \frac{[d_1(x_1^{FS}, y_1^{FS}, F_0) \ldots d_1(x_M^{FS}, y_M^{FS}, F_0)]}{\max_i d_1(x_i^{FS}, y_i^{FS}, F_0)} \quad \text{(Eq. 10)}$$

Similarly, the normalized expected deflection $\vec{d_{2,0}}$ for the second finger at each force sensor location is then calculated by dividing the expected deflection $\vec{d_2}$ for the second finger at each force sensor location by the maximum expected deflection $\max_i d_2(x_i^{FS}, y_i^{FS}, F_0)$ for the second finger according to Equation 11 (Eq. 11).

$$\vec{d_{2,0}} = \frac{[d_2(x_1^{FS}, y_1^{FS}, F_0) \ldots d_2(x_M^{FS}, y_M^{FS}, F_0)]}{\max_i d_2(x_i^{FS}, y_i^{FS}, F_0)} \quad \text{(Eq. 11)}$$

Subsequently, a first deviation is calculated for the first finger between the normalized measured deflection $m_0$ and the calculated first normalized expected deflection $d_{1,0}$ of the front surface of the touchscreen at each force sensor location. In one or more embodiments of the invention, the first deviation may be calculated as a difference between the calculated first normalized expected deflection $d_{1,0}$ and the normalized measured deflection $m_0$ of the front surface of the touchscreen at each force sensor location.

Analogously, a second deviation is calculated for the second finger between the normalized measured deflection $m_0$ and the calculated second normalized expected deflection $d_{2,0}$ of the front surface of the touchscreen at each force sensor location. In one or more embodiments of the invention, the second deviation may be calculated as a difference between the calculated second normalized expected deflection $d_{2,0}$ and the normalized measured deflection $m_0$ of the front surface of the touchscreen at each force sensor location.

Next, a first overall deviation for the first finger is determined from the first deviation at each force sensor location according to Equation 12 (Eq. 12).

$$\|\vec{d_{i,0}} - \vec{m_0}\|_2 \quad \text{(Eq. 12)}$$

In Eq. 12, $\vec{d_{i,0}} - \vec{m_0}$ refers to the calculation of the first deviation for the first finger and the calculation of the second deviation for the second finger at each force sensor location. Specifically, in Eq. 12, i=1 applies for the first finger and i=2 applies for the second finger. In addition, Eq. 12 computes the Euclidean norm of $\vec{d_{1,0}} - \vec{m_0}$ which is the square root of the sum of the first deviation squares.

Analogously, a second overall deviation for the second finger is also determined from the second deviation at each force sensor location according to Eq. 12. Further, Eq. 12 computes the Euclidean norm of $\vec{d_{2,0}} - \vec{m_0}$ which is the square root of the sum of the second deviation squares.

However, embodiments of the invention are not limited to using Eq. 12 to calculate the first and second deviations and the first and second overall deviations. Other embodiments may include alternate equations, which quantify the respective deviations between normalized measured and normalized expected deflections of the front surface of the touchscreen.

Subsequently, the calculated overall deviation for the first finger is compared with the calculated overall deviation for the second finger and it is determined that the first or the second finger applying force to the touchscreen is the finger with the smaller calculated overall deviation.

One or more of the steps of the alternate embodiment may be performed by the components and variations of the input device (100), discussed above in reference to FIGS. 1 and 2. In addition, the steps of the alternate embodiment may be partially performed by a processing system and partially performed by a host device communicatively coupled to the processing system. In one or more embodiments of the invention, one or more of the steps of the alternate embodiment may be omitted, repeated, and/or performed in a different order than the order discussed above in reference to Equation 7 through Equation 12. Accordingly, the scope of the invention should not be considered limited to the specific arrangement of steps of the alternate embodiment discussed above.

Figure 4A:
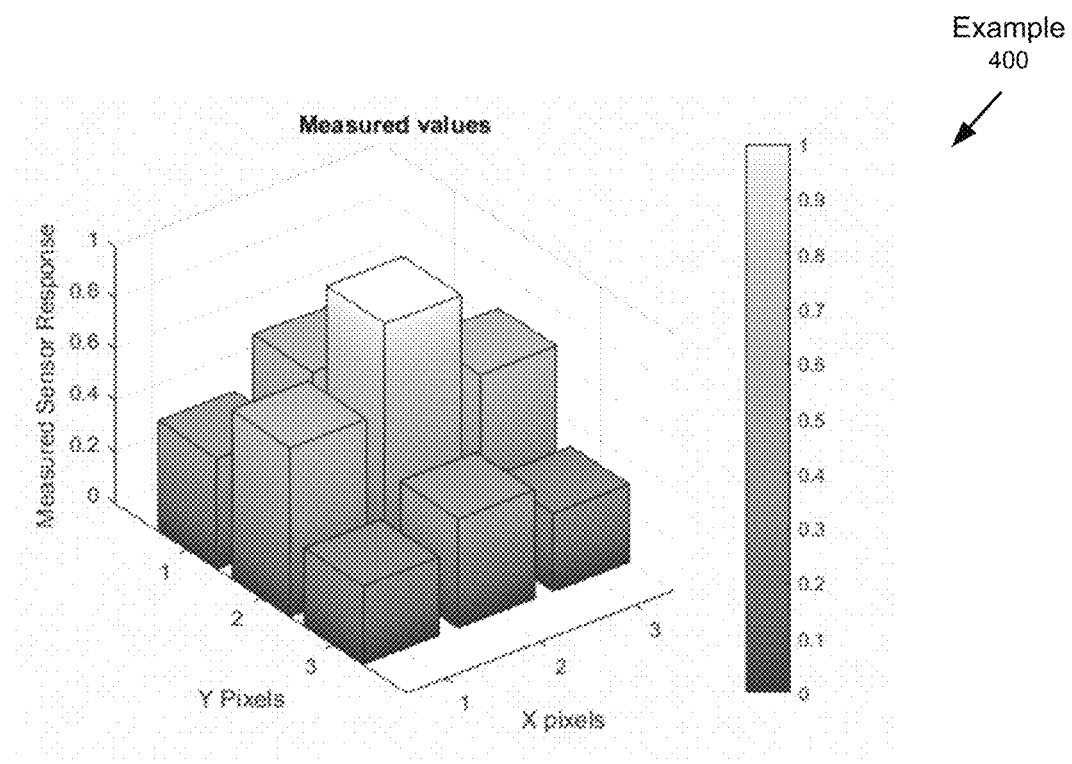
FIGS. 4A, 4B, and 4C show an example in accordance with one or more embodiments of the invention.
Figure 4B:
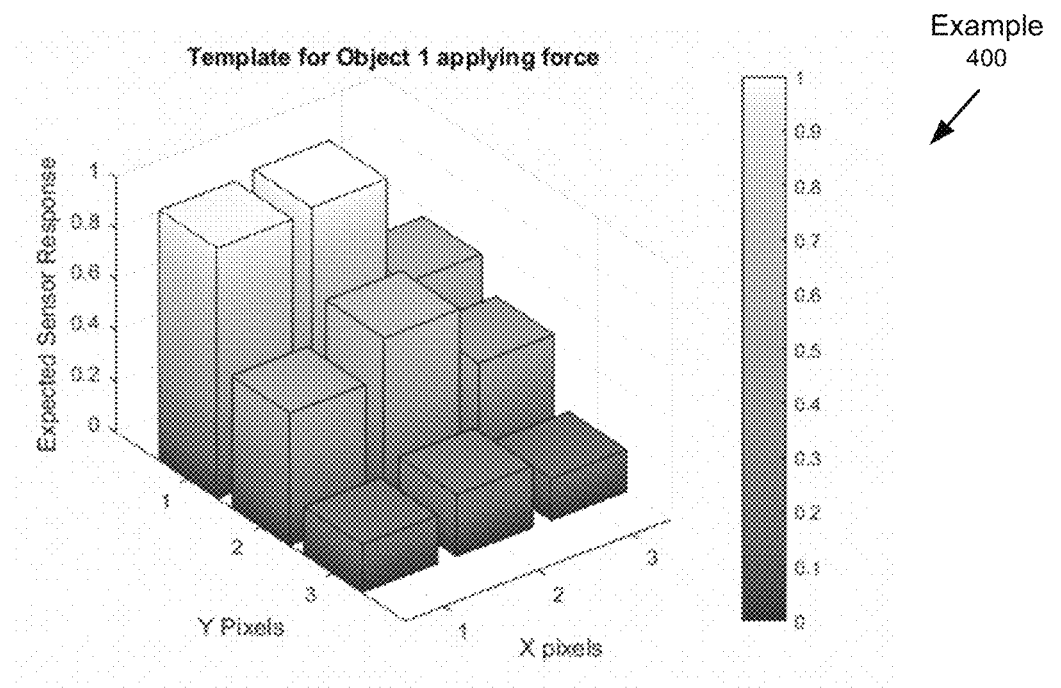
Figure 4C:
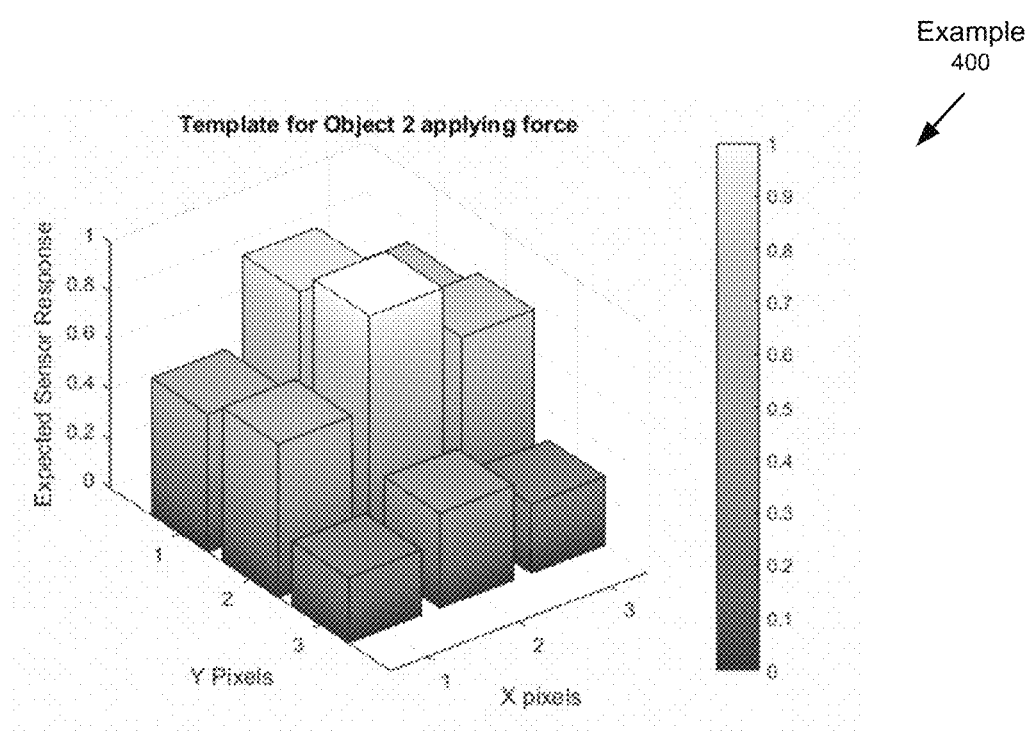

FIGS. 4A-4C show an example (400) for determining which one of the first or the second finger is applying force to the touchscreen. Specifically, FIGS. 4A-4C are three-dimensional plots in which the horizontal axes are "X pixels" and Y pixels." "X pixels" refers to how many force sensors within the force sensor array are in the X direction. Similarly, "Y pixels" refers to how many force sensors within the force sensor array are in the Y direction. In example (400), there are three pixels, (i.e., force sensors) in the X direction and also three pixels (i.e., force sensors) in the Y direction.

Now referring to FIG. 4A, the vertical axis is labeled "Measured Sensor Response." With respect to FIG. 4A, the "Measured Sensor Response" corresponds to the normalized measured deflection of the front surface of the touchscreen at each force sensor location according to Eq. 7 described above. The shading scale on the right-hand side in FIG. 4A aids in the readout of the vertical axis values. For example, at the force sensor location "X pixels"=2 and "Y pixels"=2 (i.e., center position), the normalized "Measured Sensor Response" is 1.0 and therefore represents the largest measured deflection of the front surface of the touchscreen.

FIG. 4B is a "template" for the normalized expected deflection for the first finger (object 1) at each force sensor location. The vertical axis is labeled "Expected Sensor Response." Specifically, according to Eq. 10 described above, the normalized expected deflection for the first finger is calculated at each force sensor location by dividing the expected deflection for the first finger at each force sensor location by the maximum expected deflection for the first finger. As discussed above, the normalized expected deflection for the template for the first finger is calculated based on a bending model. As can be seen from FIG. 4b, the largest expected deflection is calculated for the force sensor locations "X pixels"=1 and 2 and "Y pixels"=1.

FIG. 4C is a "template" for the normalized expected deflection for the second finger (object 2) at each force sensor location. The vertical axis is labeled "Expected Sensor Response." Specifically, according to Eq. 11 described above, the normalized expected deflection for the second finger is calculated at each force sensor location by dividing the expected deflection for the second finger at each force sensor location by the maximum expected deflection for the second finger. As discussed above, the normalized expected deflection for the template for the second finger is calculated based on a bending model. As can be seen from FIG. 4c, the largest expected deflection is calculated for the force sensor locations "X pixels"=2 and "Y pixels"=2.

As already described in reference to Eq. 12, a first overall deviation for the first finger (e.g., object 1 in FIG. 4b) and for the second finger (e.g., object 2 in FIG. 4c) are calculated at each force sensor location based on the normalized expected deflection $d_{i,0}$ and the normalized measured deflection $m_0$. Subsequently, the calculated overall deviation for the first finger is compared with the calculated overall deviation for the second finger and it is determined that the first or the second finger applying force to the touchscreen is the finger with the smaller calculated overall deviation. Specifically, with respect to example (400), it is determined that the first finger (e.g., object 1 in FIG. 4b) has the smaller calculated overall deviation and therefore the first finger is the finger applying force to the touchscreen.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for a force sensing device, the processing system comprising:
   sensor circuitry configured to receive resulting signals from a plurality of force sensors; and
   processing circuitry configured to:
      determine a first location of a first input object and a second location of a second input object on a surface of the force sensing device;
      determine a plurality of measured deflections associated with the plurality of force sensors based on the resulting signals;
      obtain a first plurality of expected deflections associated with the plurality of force sensors based on an input force being applied at the first location;
      obtain a second plurality of expected deflections associated with the plurality of force sensors based on an input force being applied at the second location;
      calculate a first deviation between the first plurality of expected deflections and the plurality of measured deflections;
      calculate a second deviation between the second plurality of expected deflections and the plurality of measured deflections; and
      determine, based on the first deviation being less than the second deviation, that the first input object is applying more force to the surface than the second input object.

2. The processing system of claim 1, wherein the first plurality of expected deflections and the second plurality of expected deflections are calculated based on a bending model.

3. The processing system of claim 2, wherein the bending model is an empirical bending model and constants of the empirical bending model are acquired during a calibration of the surface.

4. A method for operating a force sensor device comprising a surface, comprising:
   receiving resulting signals from a plurality of force sensors;
   determining a first location of a first input object and a second location of a second input object on the surface;
   determining a plurality of measured deflections associated with the plurality force sensors based on the resulting signals;
   obtaining a first plurality of expected deflections associated with the plurality of force sensors based on an input force being applied at the first location;

obtaining a second plurality of expected deflections associated with the plurality of force sensors based on an input force being applied at the second location;

calculating a first deviation between the first plurality of expected deflections and the plurality of measured deflections;

calculating a second deviation between the second plurality of expected deflections and the plurality of measured deflections; and determining, based on the first deviation being less than the second deviation, that the first input object is applying more force to the surface than the second input object.

5. The method of claim 4, wherein:

the input force being applied at the first location is a first estimated force calculated by multiplying a compensation coefficient for the first location with a sum of the plurality of measured deflections; and the first estimated force is calculated before the first plurality of expected deflections is obtained.

6. The method of claim 5, wherein:

the input force being applied at the second location is a second estimated force calculated by multiplying a compensation coefficient for the second location with the sum of the plurality of measured deflections; and the second estimated force is calculated before the second plurality of expected deflections is obtained.

7. The method of claim 5, wherein the first plurality of expected deflections is calculated based on a bending model and the first estimated force.

8. The method of claim 6, wherein the second plurality of expected deflections is calculated based on a bending model and the second estimated force.

9. The method of claim 4, further comprising:

normalizing, before calculating the first deviation, the plurality of measured deflections by dividing each of the plurality of measured deflections by the largest measured deflection in the plurality of measured deflections.

10. The method of claim 9, further comprising:

normalizing, before calculating the first deviation, the first plurality of expected deflections by dividing each of the first plurality of expected deflections by the largest expected deflection in the first plurality of expected deflections; and normalizing, before calculating the second deviation, the second plurality of expected deflections by dividing each of the second plurality of expected deflections by the largest expected deflection in the second plurality of expected deflections.

11. The method of claim 10, wherein the first plurality of expected deflections is calculated based on a bending model.

12. The method of claim 11, wherein the bending model is an empirical bending model and constants of the empirical bending model are acquired during a calibration of the surface.

13. The method of claim 12, wherein the acquired constants of the empirical bending model are stored in a lookup-table.

14. The method of claim 4, wherein:

the first deviation is a first Euclidean distance between the plurality of measured deflections and the first plurality of expected deflections; and the second deviation is a second Euclidean distance between the plurality of measured deflections and the second plurality of expected deflections.

15. The method of claim 4, wherein the first position is determined using at least one of the plurality of force sensors.

16. An input device, comprising:

a surface;

a plurality of force sensors; and a processing system that:

receives resulting signals from a plurality of force sensors;

determines a first location of a first input object and a second location of a second input object on the surface;

determines a plurality of measured deflections associated with the plurality force sensors based on the resulting signals;

obtains a first plurality of expected deflections associated with the plurality of force sensors based on an input force being applied at the first location;

obtains a second plurality of expected deflections associated with the plurality of force sensors based on an input force being applied at the second location;

calculates a first deviation between the first plurality of expected deflections and the plurality of measured deflections;

calculates a second deviation between the second plurality of expected deflections and the plurality of measured deflections; and determines, based on the first deviation being less than the second deviation, that the first input object is applying more force to the surface than the second input object.

17. The input device of claim 16, further comprising a plurality of position sensors, wherein the plurality of force sensors has a first pitch, and wherein the plurality of position sensors has a second pitch that is different than the first pitch.

18. The input device of claim 16, wherein the plurality of force sensors is arranged in an array and have a pitch, wherein the pitch is non-linear across the array and decreases from the center toward a perimeter of the array.

19. The input device of claim 16, wherein the surface is bonded to a support along at least a portion of the perimeter of the input surface.

* * * * *